United States Patent [19]

Burba, III

[11] Patent Number: 4,464,348

[45] Date of Patent: Aug. 7, 1984

[54] SELECTIVE EXTRACTION OF COBALT FROM ORES

[75] Inventor: John L. Burba, III, Angleton, Tex.

[73] Assignee: The Dow Chemical Company, Midland, Mich.

[21] Appl. No.: 456,655

[22] Filed: Jan. 10, 1983

[51] Int. Cl.³ .............................................. C22B 23/04
[52] U.S. Cl. .................................... 423/150; 423/140; 75/101 R; 75/119; 204/112
[58] Field of Search ............... 423/144, 150, 138, 139, 423/143, 145; 75/101 R, 103, 119; 204/112

[56] References Cited

U.S. PATENT DOCUMENTS 3,888,966  6/1975  Miller ...................................... 75/103
3,933,976  1/1976  Nikolic et al. ...................... 423/150
4,274,930  6/1981  Ettel et al. ........................... 423/139
4,322,390  3/1982  Tolley et al. ......................... 423/150

OTHER PUBLICATIONS

Cotton, F. Albert and Wilkinson, Geoffrey, *Advanced Inorganic Chemistry 'A Comprehensive Text'*, Interscience Publishers, 1966, pp. 864–865.

*Primary Examiner*—John Doll
*Assistant Examiner*—Robert L. Stoll
*Attorney, Agent, or Firm*—W. J. Lee

[57] ABSTRACT

Cobalt values are extracted from Co-containing ores or minerals by using an aqueous solution containing a reducing agent (e.g., hydrazine hydrosulfate). The leachant substantially rejects nickel values, thus cobalt is extracted which is substantially free of nickel.

30 Claims, No Drawings

SELECTIVE EXTRACTION OF COBALT FROM ORES

BACKGROUND OF THE INVENTION

Cobalt is known to exist in a number of ores and minerals in various parts of the world. Cobalt minerals are commonly associated with minerals or ores of nickel, iron, silver, bismuth, copper, manganese, antimony, and zinc. Because cobalt and nickel are so similar, chemically, the separation of cobalt from the presence of nickel in ores (without also separating nickel from the ore) is a problem of long standing.

A convenient reference for information concerning the occurrence, chemistry, analysis, and processing of cobalt and its alloys may be found in the chapter titled "Cobalt and Cobalt Alloys", authored by F. Planinsek and John B. Newkirk, in pp. 481-494 of the *KIRK-OTHMER ENCYCLOPEDIA OF CHEMICAL TECHNOLOGY*, Third Edition, Volume 6, published by John Wiley & Sons, Inc. 1979.

Hydrazine, $N_2H_2$, is reported to be a strong reducing agent for many metals including V, Cr, Mn, Fe, Co, Ni, Cu, As, Se, Mo, Ru, Rh, Pd, Ag, Cd, Sn, Sb, Fe, W, Re, Os, Ir, Pt, Au, Hg, Tl, Pb, Bi, Po, Ce, U, Np, and Pu. For example, it is reported to reduce $Fe_2O_3$ to $Fe_3O_4$ and to reduce chromate ions, $CrO_4^{--}$ to $Cr(OH)_3$.

It has now been found that cobalt values, i.e. $Co^{+3}$, in ores and minerals and the like may be selectively reduced and leached out, without substantial leaching of nickel values present in the ores and minerals. This is done by employing a reducing agent, e.g., hydrazine hydrosulfate, hydroxylamine, or sodium pyrosulfate, carried in an aqueous solution as a leaching agent. By this technique, efficient extraction of cobalt from the ores and minerals can be achieved without the expensive drying and roasting step which customarily precedes chemical extraction of the cobalt values, and without simultaneous extraction of substantial amounts of associated nickel values.

SUMMARY OF THE INVENTION

A cobalt-containing ore or mineral and the like, such as lateritic ore, is particulated and leached with an aqueous solution containing a reducing agent, such as hydrazine hydrosulfate, hydroxylamine, or sodium pyrosulfate, and the like to reduce $Co^{+3}$ values. The filtrate or leachate, containing the reduced cobalt, but containing little or no nickel values, is concentrated or otherwise treated to recover the cobalt therefrom.

DETAILED DESCRIPTIONS

The cobalt-containing ores or minerals and the like, within the purview of the present invention may be any which contain cobalt values in their native state, such as lateritic ores, in which the oxidation state of the Co is $+3$. Of these, the laterite-type ores are of special interest in the present invention in that the obtaining of Ni or Co, separate from each other, from lateritic ores has long been a troublesome task.

The reducing agent may be any reducing agent strong enough to reduce $Co^{+3}$ without substantially reducing and/or leaching out nickel values and is preferably any one, or more, of those selected from the group comprising hydrazine, hydroxylamine, sodium pyrosulfate, alkali metal persulfate and the like; hydrazine hydrosulfate ($N_2H_4.H_2SO_4$) is especially preferred. The following descriptions deal with $N_2H_4.H_2SO_4$ for purposes of conciseness, though it will be understood that the other reducing agents named above are applicable in the descriptions.

The amount of $N_2H_4.H_2SO_4$ used in the solution is in the range of about 5% of saturation to about 100% of saturation in the solution, preferably about 10% to about 15% by weight. The amount of reducing agent should be about 1 equivalent per equivalent of cobalt, or more.

THE PROCESS IN GENERAL

The cobalt-containing ore or mineral, in particulate or pulverized form, is treated with the brine and reducing agent, especially with stirring, at a temperature in the range of about $0°$ C. to about $100°$ C., especially about $25°$ C. to about $50°$ C., for a period of time in the range of about 1-minute to about 90 minutes, or at least enough time to assure good contact of the leachant.

Then the solution is removed from the solids, such as by filtration or decantation, and the cobalt values which have gone into the solution are recovered therefrom by, for example, ion exchange, solvent extraction, precipitation, or evaporation of the aqueous solution.

The particle size of the pulverized ore or mineral is preferably in the range of powders or small pellets of less than about 10 mesh in size; it will be understood that the larger the particles, the more difficult it is to extract the cobalt values from deep within each particle.

Whereas some operability is achieved without stirring the ore during the treatment with the reducing agent, it is best to employ agitation, especially vigorous agitation which, because of particle attrition, is especially beneficial.

Separation of the solution from the solids (ore, etc.) may be done by any convenient means such as by filtration, by decantation, or by draining the liquid from a centrifuge.

The following example illustrates an embodiment of the present invention, but the scope of the invention is not limited to the embodiment illustrated.

EXAMPLE I

A raw laterite ore is pulverized to particles in the range of about 100-200 mesh, U.S. Standard Sieve size. A 9.4 gram sample, containing about 1.25% Ni and about 0.25% Co, is mixed with 200 ml. of de-ionized water to which 0.45 gm. of $N_2H_2.H_2SO_4$ is added (pH about 4). The mixture is stirred vigorously at $45°-50°$ C. for about 30 minutes and filtered. The filtrate and washings are diluted to 500 ml and analyzed for Co and Ni by atomic absorption. No Ni is detected in the sample, but essentially all the Co is found to have been leached from the ore, as shown by the following calculations of the analyzed amounts.

The concentration of the diluted leach solution is about 50 mg of $Co^{+2}$/liter, thus about 25 mg of Co is calculated as being in the 500 ml. of diluted leachant. This compares with about 23.5 mg of Co calculated to have been in the 9.4 gm. ore sample; the analysis of the ore does not give precise percentages, but is believed to be reasonably close.

This example illustrates that even though the ore contained about 5 times as much Ni as there was Co, the absence of Ni in the leachant and the presence of virtually all the Co in the leachant shows a pronounced selectivity for Co over Ni.

We claim:

1. A process for extracting cobalt values from a cobalt-containing solid material comprising ores, minerals, slags, or gangues which contain reducible cobalt in the +3 state, said cobalt-containing material also containing nickel values, said process consisting essentially of the sequential steps of contacting the cobalt-containing material, in particulate form, with an aqueous solution containing a reducing agent of at least one from the group comprising hydrazine, hydroxylamine, hydrazine hydrosulfate, sodium pyrosulfate, and alkali metal persulfate, which substantially reduces cobalt values but which reduces little or no nickel values, thereby obtaining reduced cobalt values in solution, with little or no nickel values in the solution, separating said solution, containing reduced cobalt values, from the nickel-containing insolubles, and recovering cobalt values, substantially free of nickel values, from the solution.

2. The process of claim 1 wherein the cobalt-containing material comprises a lateritic ore.

3. The process of claim 1 wherein the reducing agent is hydrazine hydrosulfate.

4. The process of claim 1 wherein the reducing agent is hydrazine.

5. The process of claim 1 wherein the reducing agent is sodium pyrosulfate.

6. The process of claim 1 wherein the reducing agent is hydroxylamine.

7. The process of claim 1 wherein the reducing agent is alkali metal persulfate.

8. The process of claim 1 wherein the ore is laterite and the reducing agent is hydrazine hydrosulfate.

9. The process of claim 1 wherein the cobalt-containing material is particulated to a size small enough to pass through a 10 mesh sieve.

10. The process of claim 1 wherein the cobalt-containing material comprises particles of less than about 100 mesh sieve size.

11. The process of claim 1 wherein the temperature of the aqueous solution is in the range of about 0° C. to about 100° C.

12. The process of claim 1 wherein the temperature of the aqueous solution is in the range of about 25° C. to about 50° C.

13. The process of claim 1 wherein the contacting of the cobalt-containing material with the reducing agent solution is for a duration in the range of about 1 minute to about 90 minutes.

14. The process of claim 1 wherein the concentration of the reducing agent in the aqueous solution is in the range of about 5 percent of saturation to about 100 percent of saturation.

15. The process of claim 1 wherein the concentration of the reducing agent in the aqueous solution is in the range of about 10 percent to about 15 percent by weight.

16. The process of claim 1 wherein agitation is applied during the contacting step with the reducing agent.

17. A process for extracting cobalt values from a cobalt-containing and nickel-containing solid, particulate material comprising ores, minerals, slage, or gangues, while substantially avoiding extraction of nickel values, said process consisting essentially of the sequential steps of contacting said material with an aqueous solution containing a reducing agent of at least one from the group comprising hydrazine, hydroxylamine, hydrazine hydrosulfate, sodium pyrosulfate, and alkali metal persulfate, said reducing agent being capable of reducing cobalt from a +3 state, but not substantially capable of reducing nickel, thereby obtaining reduced cobalt values dissolved in said solution, and separating said solution, containing reduced cobalt values, substantially free of nickel values, from the insolubles.

18. The process of claim 17 in which the ore or mineral is of a particle size of 10 mesh or smaller and in which agitation is applied during the contact with the aqueous solution.

19. The process of claim 17 wherein the cobalt-containing material comprises a lateritic ore.

20. The process of claim 17 wherein the reducing agent is hydrazine hydrosulfate.

21. The process of claim 17 wherein the reducing agent is hydrazine.

22. The process of claim 17 wherein the reducing agent is sodium pyrosulfate.

23. The process of claim 17 wherein the reducing agent is hydroxylamine.

24. The process of claim 17 wherein the reducing agent is alkali metal persulfate.

25. The process of claim 17 wherein the cobalt-containing material is laterite ore and the reducing agent is hydrazine hydrosulfate.

26. The process of claim 17 wherein the temperature of the aqueous solution is in the range of about 0° C. to about 100° C.

27. The process of claim 17 wherein the temperature of the aqueous solution is in the range of about 25° C. to about 50° C.

28. The process of claim 17 wherein the contacting of the cobalt-containing material with the reducing agent solution is for a duration in the range of about 1 minute to about 90 minutes.

29. The process of claim 17 wherein the concentration of the reducing agent in the aqueous solution is in the range of about 5 percent of saturation to about 100 percent of saturation.

30. The process of claim 17 wherein the concentration of the reducing agent in the aqueous solution is in the range of about 10 percent to about 15 percent by weight.

* * * * *